United States Patent
Kumar

(10) Patent No.: US 10,182,057 B1
(45) Date of Patent: Jan. 15, 2019

(54) HIGHLY SCALABLE FINE GRAINED RATE LIMITING

(71) Applicant: Avi Networks, Santa Clara, CA (US)

(72) Inventor: Raju Kumar, San Jose, CA (US)

(73) Assignee: Avi Networks, Santa Clara, CA (US)

( * ) Notice: Subject to any disclaimer, the term of this patent is extended or adjusted under 35 U.S.C. 154(b) by 237 days.

(21) Appl. No.: 15/064,322

(22) Filed: Mar. 8, 2016

Related U.S. Application Data

(60) Provisional application No. 62/198,420, filed on Jul. 29, 2015.

(51) Int. Cl.
*H04L 29/06* (2006.01)
*H04L 12/26* (2006.01)
*H04L 12/801* (2013.01)
*G06F 17/30* (2006.01)

(52) U.S. Cl.
CPC ...... *H04L 63/102* (2013.01); *G06F 17/30949* (2013.01); *H04L 43/0894* (2013.01); *H04L 43/16* (2013.01); *H04L 47/10* (2013.01); *H04L 67/42* (2013.01)

(58) Field of Classification Search
CPC .................................................... H04L 63/102
See application file for complete search history.

(56) References Cited

U.S. PATENT DOCUMENTS

| | | | |
|---|---|---|---|
| 9,483,286 B2 | 11/2016 | Basavaiah | |
| 9,871,849 B2 * | 1/2018 | Chauhan | H04L 67/10 |
| 2009/0180430 A1 * | 7/2009 | Fadell | H04L 12/5695 370/329 |

OTHER PUBLICATIONS

Peterson et al. Computer Networks: A Systems Approach. pp. 507-509. Elsevier, 2007.
George Varghese. Network Algorithmics. pp. 385-387, 2005.

* cited by examiner

*Primary Examiner* — Simon P Kanaan
(74) *Attorney, Agent, or Firm* — Van Pelt, Yi & James LLP

(57) ABSTRACT

Techniques of the present disclosure provide an embodiment of a multistage filter (MSF) that takes a rate limiting parameter. The entries of the MSF are updated upon each access. Each update may cause a different breakdown of entries in the MSF and the entries can be dynamically set to reduce collisions and their impact. In some embodiments, the MSF is: configured based on the rate limiting parameter, used to dynamically monitor network traffic and changing assignments, and adjustable in size. In some embodiments, hashing is performed on a per-row basis and seeding initializes entries of the buckets to entries that are the same within a given row and different within a given column.

24 Claims, 6 Drawing Sheets

|   |   |   |   |
|---|---|---|---|
| 1 | 1 | 1 | 1 |
| 2 | 2 | 2 | 2 |
| 2 | 2 | 2 | 2 |

FIG. 6A
600

|   |   |   |   |
|---|---|---|---|
| 0 | 1 | 1 | 1 |
| 2 | 2 | 2 | 2 |
| 2 | 2 | 2 | 2 |

FIG. 6B
610

|   |   |   |   |
|---|---|---|---|
| 0 | 1 | 1 | 1 |
| 2 | 2 | 1 | 2 |
| 2 | 2 | 2 | 2 |

FIG. 6C
620

|   |   |   |   |
|---|---|---|---|
| 0 | 1 | 1 | 1 |
| 2 | 2 | 0 | 2 |
| 2 | 2 | 2 | 2 |

FIG. 6D
630

|   |   |   |   |
|---|---|---|---|
| 0 | 1 | 1 | 1 |
| 2 | 2 | 0 | 2 |
| 2 | 1 | 2 | 2 |

FIG. 6E
640

|   |   |   |   |
|---|---|---|---|
| 0 | 1 | 1 | 1 |
| 2 | 2 | 0 | 2 |
| 2 | 0 | 2 | 2 |

FIG. 6F
650

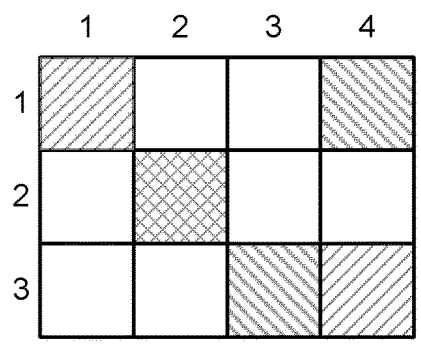
FIG. 7
700
FIG. 8
800
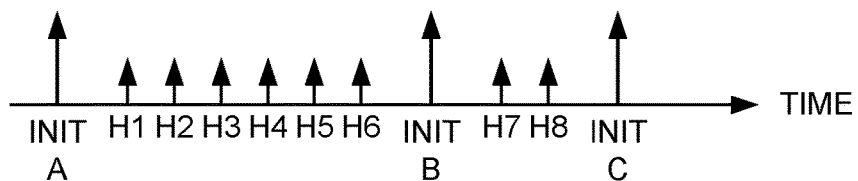

HIGHLY SCALABLE FINE GRAINED RATE LIMITING

CROSS REFERENCE TO OTHER APPLICATIONS

This application claims priority to U.S. Provisional Patent Application No. 62/198,420 entitled HIGHLY SCALABLE FINE GRAINED RATE LIMITING filed Jul. 29, 2015 which is incorporated herein by reference for all purposes.

BACKGROUND OF THE INVENTION

Managing traffic over a network becomes increasingly difficult as more clients gain access to a content delivery network and more content is made available for access. Conventional techniques for managing network traffic typically use an application delivery controller (ADC), which is a network device that manages traffic. For example, the ADC controls how a client accesses files by distributing traffic among physically distributed sites (e.g., servers) based on application-specific criteria such as limiting a rate at which resources are accessible. The ADC manages access of resources by handling client requests for those resources. Mismanagement of client requests can cause backend servers to be overwhelmed or overused by clients. Conventional ADCs are memory and computationally intensive and are usually not scalable to accommodate growing numbers of clients and content. Therefore, there exists a need in the art for scalable and effective network traffic management.

BRIEF DESCRIPTION OF THE DRAWINGS

Various embodiments of the invention are disclosed in the following detailed description and the accompanying drawings.

FIG. 6A is a block diagram illustrating a multistage filter according to an embodiment of the present disclosure.

FIG. 6B is a block diagram illustrating a multistage filter according to an embodiment of the present disclosure.

FIG. 6C is a block diagram illustrating a multistage filter according to an embodiment of the present disclosure.

FIG. 6D is a block diagram illustrating a multistage filter according to an embodiment of the present disclosure.

FIG. 6E is a block diagram illustrating a multistage filter according to an embodiment of the present disclosure.

FIG. 6F is a block diagram illustrating a multistage filter according to an embodiment of the present disclosure.

FIG. 7 is a block diagram illustrating a multistage filter with a hash collision according to an embodiment of the present disclosure.

FIG. 8 is a conceptual diagram illustrating timing of initialization and re-initialization of a filter according to an embodiment of the present disclosure.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques of the present disclosure provide a filter for managing network traffic including tracking client requests for resources and limiting the rate of access of the resources. The techniques described herein can be implemented by a processor such as an application delivery controller (ADC). The ADC can be implemented as software components executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In this example, the ADC is implemented as a network device that manages network traffic within an application delivery network. The ADC allows clients to request web resources.

Figure 1:
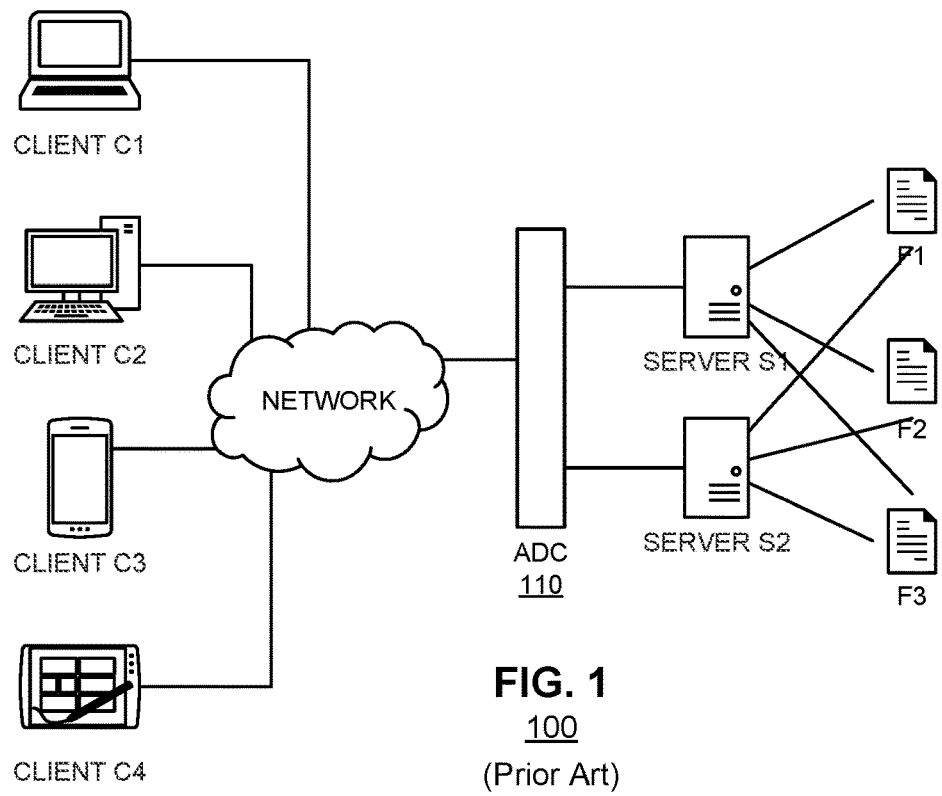
FIG. 1 is a block diagram illustrating a conventional application delivery network.

FIG. 1 is a block diagram illustrating an application delivery network 100 with a conventional ADC 110. The application delivery network 100 can include the ADC 110, clients C1-C4, servers S1 and S2, and resources F1-F3. The clients C1-C4 can provide an interface for users to access the resources F1-F3. The clients C1-C4 can be implemented by any processing device, for example, a smartphone, tablet, desktop, computer, etc. The user may access the resources via a web browser or other application executing on the clients. The ADC 110 can receive requests from the clients C1-C4 and direct requests to appropriate server(s) S1, S2. The request made by a client may be a request for one or more resources F1-F3. The servers S1, S2 can receive a request processed by the ADC 110, determine a requested resource, and respond to the requests by the clients C1-C4. The resources F1-F3 can be content such as media items, files, dynamically generated responses, and the like. Although the application delivery network 100 is illustrated using the example of four different clients, two servers, and three resources, the numbers and/or types of clients, servers, and resources can vary depending on network configuration and needs. For example, in some embodiments, the application delivery network includes one or more clients, one or more servers, and one or more resources.

In operation, the clients C1-C4 access the resources F1-F3 (e.g., Hypertext Markup Language (HTML) files) by sending requests (e.g., Hypertext Transfer Protocol (HTTP) requests specifying the Universal Resource Identifiers (URIs) corresponding to the HTML files) to the ADC 110. In response to receipt of the request, the ADC 110 routes the request to one or more of the servers S1, S2. The servers S1, S2 then permit access to the appropriate file(s) F1-F3. In other words, a client $C_i$ can access a file $F_j$ with the aid of ADC 110. For example, a user ($C_i$) browsing a news website can access a news report file ($F_j$).

Clients may make different requests according to criteria, needs, etc. The resources may impose differing loads on backend servers that serve the resource due to different access requests. For example, a popular resource (e.g., one that is frequently requested) may impose a heavier load on a backend server than a resource that is less frequently requested. As another example, automatic bots might attempt to access the files by sending many requests for a resource in a short span of time. As yet another example, a denial-of-service attack can bring down a website by making multiple requests for the same file in a short period of time, overloading servers, and causing the servers to fail. To handle these scenarios, an ADC can provide admission control, which limits the number of accesses of resources by clients (also referred to as "rate limiting").

Conventional admission control techniques typically use a filter such as a token bucket filter (TBF) to rate limit clients and/or resources. A conventional ADC provides admission control by limiting access of resources by clients at a rate specified by the administrator, where the clients are uniquely identified (e.g., each client has a unique IP address) and the resources are uniquely identified (e.g., each resource has a unique name). In some conventional implementations, the ADC does not know the set of clients and/or the set of resources. In other conventional implementations, the ADC periodically collects client or resource identifiers and rate limits the access of one or more resources by one or more clients. However, the periodic collection of identifiers leads to inaccurate information and is computationally expensive, especially when clients and/or resources change frequently.

A conventional ADC is also not readily scalable because a TBF is typically implemented as a counter with a timer for each client, resource, or client-resource combination. When managing upwards of millions of clients and billions of resources, maintaining a TBF for each client, resource, or client-resource combination would consume large amounts of memory and computing power. To enable clients to access resources, conventional ADCs are preconfigured for the scenario in which all clients access all resources all the time. Further, the list of clients and/or resources tends to grow over time, thus requiring more memory to store the list. This results in inaccurately and inefficiently preconfigured ADCs.

Admission control can be performed by defining a rate at which a client can access a resource. The rate can be described by rules and/or parameters ("parameters" for simplicity). For example, a parameter can be defined by an administrator or while configuring the ADC. For example, a parameter can define a limited number of times that: (i) a particular client can access any resource, (ii) any client can access a particular file, and (iii) a particular client can access a particular file. For example, the parameter can be on the order of hundreds of accesses per second. In an embodiment, each of (i), (ii), and (iii) can correspond to its own "setting," allowing for configuration of some or all of these settings.

As described herein, in a conventional ADC, admission control is enforced using a data structure such as a TBF, which requires learning and tracking the identity of the clients and/or files. Typically one instance of a TBF is needed for each known client and/or file. The expense for each of the settings (in terms of memory and CPU) is as follows:

| Setting | Rule | Computational Expense |
|---|---|---|
| S1 | $C_i \to *$ | $|C_i| = n$ |
| S2 | $* \to F_j$ | $|F_j| = m$ |
| S3 | $C_i \to F_j$ | $|C_i F_j| = nm$ | where $C_i$ represents the ith client, $F_j$ represents the jth resource, and * represents any file or any client. Supposing the cardinality (e.g., a number of elements in a set) of a set of $C_i$ is n, then n instances of the TBF would accommodate setting S1. Supposing the cardinality of a set of $F_j$ is m, then m instances of the TBF would accommodate setting S2. Supposing the cardinality of a set of $C_i$ is n and the cardinality of a set of $F_j$ is m, then nm instances of the TBF would accommodate setting S3. Typically, n is on the order of $10^5$ and m is on the order of $10^6$.

Figure 2:
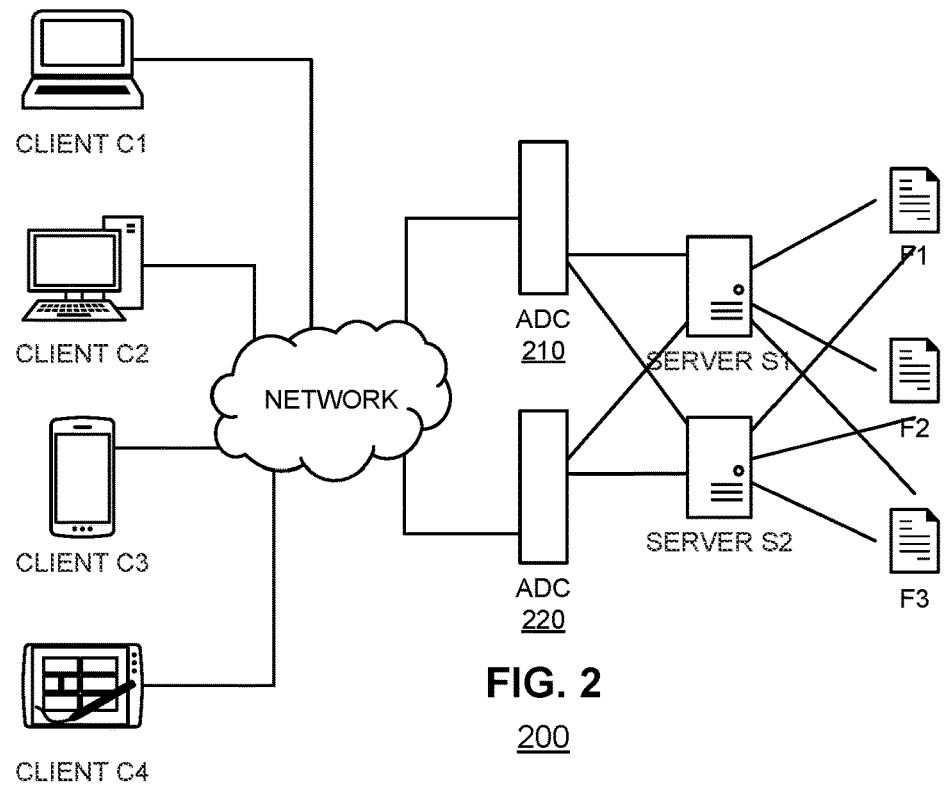
FIG. 2 is a block diagram illustrating an application delivery network according to an embodiment of the present disclosure.

In some embodiments, the functionality of the ADC 110 can be split across two or more devices. FIG. 2 shows an application delivery network 200 including a first ADC 210 and a second ADC 220 that function together as a distributed ADC. For example, the ADCs 210, 220 can be implemented as processors with less memory and/or computing power compared with the ADC 110. The ADCs 210, 220 are referred to as a "micro service engine" or a "micro ADC" for simplicity, and the like.

The micro ADCs advantageously accommodate physical devices with lower computing power (e.g., less memory, fewer cores, etc.). Also, the combined computing ability of the micro ADCs can exceed the ability of a single, relatively large ADC (e.g., ADC 110). However, as described herein, conventional admission control requires tracking TBFs, and, in the context of micro ADCs, each micro ADC stores a copy of each TBF. At the same time, the micro ADCs have reduced memory compared with the large ADC 110. Thus, it becomes even more difficult to fit the number of TBFs needed to accommodate a large number of clients and files in each micro ADC. Thus, traffic management is even more challenging for micro ADCs compared with a conventional ADC because of the reduced computing capability.

FIG. 2 is a block diagram illustrating an application delivery network 200 with micro ADCs 210, 220. The application delivery network 200 can include the ADCs 210, 220, clients C1-C4, servers S1 and S2, and resources F1-F3. The clients C1-C4 can provide an interface for users to access the resources F1-F3. The clients C1-C4 can be implemented by any processing device, for example, a smartphone, tablet, desktop, computer, etc. The user may access the resources via a web browser or other application executing on the clients. The ADCs 210, 220 can receive requests from the clients C1-C4 and direct requests to appropriate server(s) S1, S2. The request made by a client may be a request for one or more resources F1-F3. The servers S1, S2 can receive a request processed by the ADCs 210, 220, determine a requested resource, and respond to the requests by the clients C1-C4. The resources F1-F3 can be content such as media items, files, and the like. Although the application delivery network 200 is illustrated using the example of four different clients, two ADCs, two servers, and three resources, the numbers and/or types of clients, ADCs, servers, and resources can vary depending on network configuration and needs. For example, in some embodiments, the application delivery network includes one or more clients, one or more ADCs, one or more servers, and one or more resources. The ADCs 210, 220 can function independently or cooperate to perform the techniques described herein.

In operation, the clients C1-C4 access the resources F1-F3 (e.g., Hypertext Markup Language (HTML) files) by sending requests (e.g., Hypertext Transfer Protocol (HTTP) requests specifying the Universal Resource Identifiers (URIs) corresponding to the HTML files) to the ADC 210 or ADC 220. In response to receipt of the request, the ADCs 210, 220 route the request to one or more of the servers S1, S2. The servers S1, S2 then permit access to the appropriate file(s) F1-F3. In other words, a client $C_i$ can access a file $F_j$ with the aid of ADC 210 or ADC 220. For example, a user ($C_i$) browsing a news website can access a news report file ($F_j$).

Techniques of the present disclosure provide dynamic and implicit tracking and rate limiting for an entity. The entity can include a client, a resource, or a client-resource combination. A client-resource combination can be one-to-one, many-to-many, many-to-one, or one-to-many. The techniques described herein find application in devices for admission control including the ADCs described herein, e.g., the ADC 110 and the micro ADCs 210 and 220. As further explained herein, according to the techniques of the present disclosure, when a positive admission control decision is made for an entity, the entity is permitted to access a requested resource and one or more entries corresponding to the entity in a filter are updated. On the other hand, if none of the entries meet a rate limiting criteria, the entity is denied access to the requested resource. An entry can be initialized periodically, which affects a rate limit per entity functionality. Thus, rate limiting can be achieved without explicitly tracking the entities themselves. This achieves very high scalability because the implementation requires small amounts of memory and CPU cycles. This also allows the system to adapt to varying client identities, and varying resource access patterns over time. An administrator does not need to specify a list of client IPs or a list of resource identifiers or any combination thereof. In an embodiment, given a parameterized specification of acceptable access patterns, e.g., "any client should not access any resource more than 5 times in 2 seconds," the techniques described herein can implement effective and efficient rate limiting.

Figure 3A:
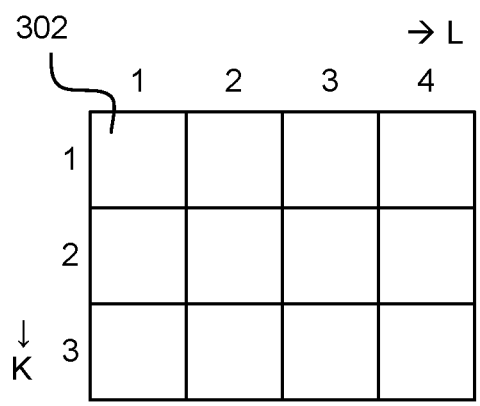
FIG. 3A is a block diagram illustrating a filter according to an embodiment of the present disclosure.

FIG. 3A shows an example filter 310. The filter 310 can provide admission control without requiring tracking of the identities of clients and/or files. The filter can be implemented by a multistage filter (MSF) such as a two-dimensional hash table with k rows and l columns, where k and l are integers. The values of k and l depend on implementation and can be chosen by the designer or system administrator. In the example shown in FIG. 3A, the hash table has k=3 rows and l=4 columns. The position of a bucket in the filter 310 can be described by its column and row, represented using a form such as (column, row). For example, bucket 302 in the first row and the first column can be described as bucket (1, 1).

In an embodiment, the filter 310 can be a hash table that is populated by performing a hash function on an entity. The entity can be a client identifier, a resource identifier, and/or a combination of the client identifier and the resource identifier. That is, a hash function can map an entity to an index, where the index locates the bucket in the hash table where the corresponding entry (content of a bucket) is stored. The hash function can be predefined and dynamically changed based on characteristics of the network traffic such as load on servers and volume of traffic. Examples of the hash function include a cryptographic hash function such as MD5, SHA-1, SHA-2, etc. The entry refers to a value in the hash bucket. An entry is also referred to as "content" and can be based on a rate limiting parameter such as a number of connections or bandwidth, as further described below. The entry can include a counter, token, value, or any other appropriate data. For example, a hash function can determine an entry in a particular row, representing information for an entity.

Example settings and hashes are:

| Setting | Hashing Function |
| --- | --- |
| S1 | $h_k(C_i)$ |
| S2 | $h_k(F_j)$ |
| S3 | $h_k(C_iF_j)$ | where, $C_i$ represents the ith client, $F_j$ represents the jth resource, k is a current row in the hash table, and $h_k$ represents a hash function corresponding to a setting. The input to the hash function is constructed from an identifier associated with the client ($C_i$), requested content ($F_j$), or a combination of both ($C_iF_j$). The identifier can include numbers, alphanumerical strings, and the link. For a single row, a given input is hashed to one of the l columns (hash buckets). Preferably, the hash function evenly and randomly distributes inputs to the hash buckets. The settings can be provided as selectable options when an ADC is configured. For example, one or more of the settings can be selected such that a request by an entity triggers a hash function corresponding to the setting. Each setting corresponds to a different filter. Some or all of the settings can be switched on in the ADCs.

Figure 3B:
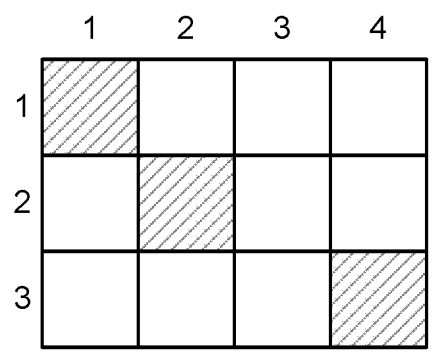
FIG. 3B is a block diagram illustrating a filter according to an embodiment of the present disclosure.

FIG. 3B shows an exemplary state of a filter 320 after several hashing functions are performed for a particular entity. In this example, for each entity, there is a corresponding bucket in a given row. Hashing the entity with a first hash function results in a corresponding entry (1, 1) in the first row in the hash table, hashing the entity with a second hash function results in a corresponding entry (2, 2) in the second row, and hashing the entity with a third hash function results in a corresponding entry (4, 3). In other words, each entity gets a hash for each row of the hash table, and so on until all rows of the hash tables have been completed.

In this example, a hash function for one row is independent of a hash function used for another row. For example, there can be as many different hash functions as rows in the hash table. Some rows can correspond to the same hash function. Using the setting table shown above, a hash function for the first row can be represented as $h_1$(entity), a hash function for the second row can be represented as $h_2$(entity), and a hash function for the third row can be represented as $h_3$(entity). In FIG. 3B, bucket (1, 1) can be populated by a first hash function, bucket (2, 2) can be populated by a second hash function, and bucket (4, 3) can be populated by a third hash function.

A bucket can be populated or changed in a variety of ways. For example, an entry in the bucket can include a counter, one or more tokens, a value representing information about the entity, and the like, as further described herein. A counter can track the number of requests the entity has made previously. A token can represent an ability to perform some operation. For example, the token can be an access token such that possession of the token permits access control operations. An entity can request a token, and can successfully access content if the token is provided to the entity. Each bucket can be initialized with a pre-defined number of tokens and decremented when there is a hash function resulting in a hit, as further described herein.

Figure 4:
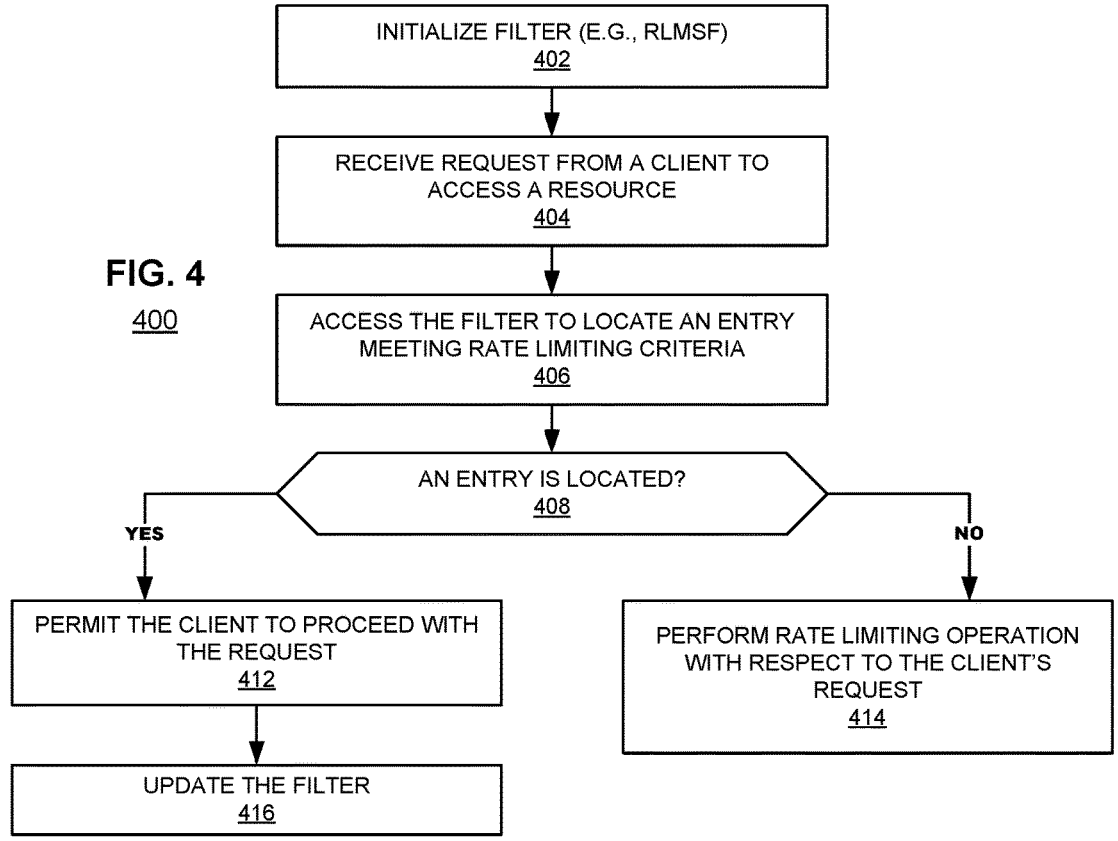
FIG. 4 is a flowchart illustrating a method for rate limiting according to an embodiment of the present disclosure.

FIG. 4 is a flowchart illustrating a method 400 for rate limiting. The method 400 can be performed by a processor such as the ADC 110 shown in FIG. 1 or ADCs 210, 220 shown in FIG. 2.

In 402, a filter is initialized. The filter can be an MSF (also referred to as a "rate limiting multistage filter" or "RLMSF"). In an embodiment, the MSF is implemented according to techniques described herein, e.g., the MSFs described in FIGS. 3A and 6A. The initialization can include populating the filter with default values based on a rate limiting parameter, as further described herein.

In 404, a client request is received. In this example, the request is for access to a resource. For example, the request can be by a web user for an article from a news website. In response to the request, control passes to 406. In 406, the filter is accessed to determine whether an entry corresponding to the client request meets a rate limiting criteria. For example, the rate limiting criteria can be a threshold defining load characteristic or admission control. The filter is accessed to locate an entry in the filter that meets the rate limiting criteria. In an embodiment, accessing the filter includes hashing a client identifier of the client, a resource identifier, or both to one or more entries within the filter as further described herein, e.g., in relation to FIG. 5.

In 408, it is determined whether an entry in the filter has been located. In an embodiment, an entry is located when a rate limiting criteria is met. In an embodiment, an entry can be a token and the entry meets a rate limiting criteria when at least one token remains in the bucket. The token can permit access to the resource requested by the client. In an embodiment, an entry meets a rate limiting criteria when a value of an entry is above a threshold. The threshold can be a characteristic corresponding to load such as number of connections, bandwidth, and the like. For example, the threshold can be 0 connections. So long as a number of connections is greater than 0, an entry is located. As another example, the threshold can be 0 MB. So long as the bandwidth is greater than 0 MB, an entry is located. In another embodiment, an entry meets a rate limiting criteria when a value of an entry is below a threshold. For example, the threshold can be 5 connections. So long as a number of connections is less than 5, an entry is located. As another example, the threshold can be 500 MB. So long as the bandwidth is less than 500 MB, an entry is located.

In the event that the entry meeting the rate limiting criteria is located, control passes to 412 in which the client is permitted to proceed with the request, e.g., the system fulfills at least part of a request. For example, a download of the file can be initiated, a database query can be made, a transaction can be processed, etc. Control can then pass to 416 in which the filter is updated. In an embodiment, the filter can be updated by updating the located entry, as further described herein, e.g., in relation to FIGS. 6A-6F. Depending on the form of the entry, different update actions can take place. For example, a counter can decrement by a pre-determined value. A number of connections represented by the entry can be decremented by one to represent that the access constitutes using one of a pre-allocated number of connections allowed. A number of tokens can decrement by a pre-determined value to represent that a token has been provided to a requesting entity. A number of bandwidth measurements can be decreased by a size of the resource to represent that the access used a quantity of a total allowed bandwidth for a particular client/resource pair.

In the event that the entry meeting the rate limiting criteria is not located, control passes to 414 in which a rate limiting operation is performed with respect to the client's request. The type of rate limiting operation can be pre-defined, e.g., defined by an administrator and/or customized to a situation. For example, a rate limiting operation includes one or more of: dropping a connection, slowing down a connection, logging or reporting the event, and the like. Dropping the connection can include denying access of a resource by the client, not complying with part or all of the client request, etc. Slowing down the connection can include downgrading a level of service provided to the client, changing a rate of data transfer of a connection between the client and the resource, etc., which may cause the completion of the request to take longer than with a typical connection.

Figure 5:
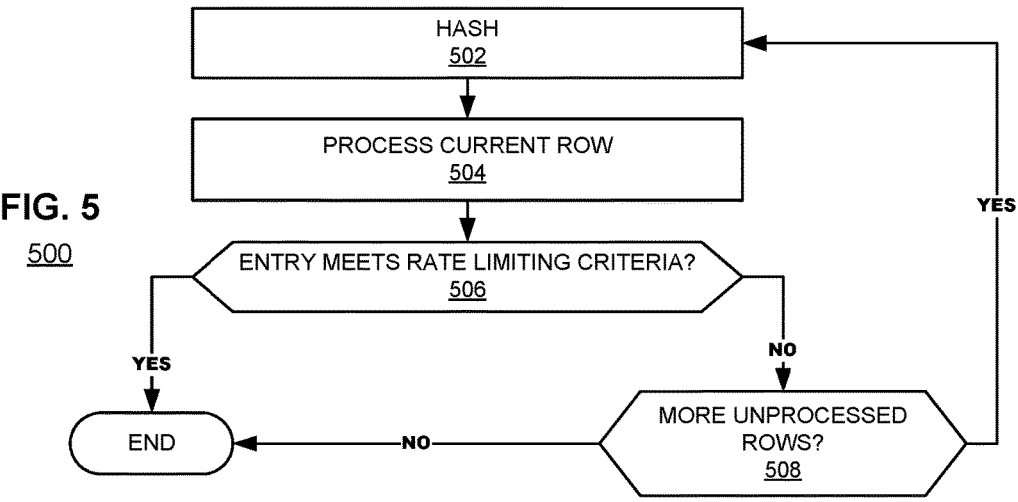
FIG. 5 is a flowchart illustrating a method for rate limiting according to an embodiment of the present disclosure.

FIG. 5 is a flowchart illustrating a method 500 for rate limiting. The method 500 can be performed as part of another method, e.g., 406 and 408 of method 400. For example, the method 500 can pass information regarding whether an entry is located back to method 400. The method 500 can be performed by a processor such as the ADC 110 shown in FIG. 1 or ADCs 210, 220 shown in FIG. 2.

The method 500 can be applied to locate an entry meeting a rate limiting criteria. The method is completed when: (a) an entry meeting the rate limiting criteria is located or (b) no entry meeting the rate limiting criteria is located. In some cases, the result of method 500 is passed on to 412 if the result is yes, or to 414 if the result is no.

In 502, an identifier of an entity is hashed, where the entity can be a client identifier, a resources identifier, or a combination thereof. The entity identifier can be an alphanumeric string, a number, or in any other appropriate format. In an embodiment, the entity is hashed with a function to generate a hit in a hash bucket in a current row. Based on the hash hit, a current row can be processed in 504. As described herein, a first hash function of the entity can correspond to an entry in a first row of the hash table. The row corresponding to the hash function can be processed to determine a location of the entry corresponding to the hash value generated. In 506, it can be determined whether an entry meets a rate limiting criteria. For example, a rate limiting criteria can be a non-zero connection. In this case, if the entry corresponding to the hash hit is non-zero, the method ends. In an embodiment, the method 500 can end and pass information back to method 400 (not shown), indicating that an entry is located. Otherwise, control can pass to 508 to determine whether there are any more unprocessed rows in the hash table. If there are more rows, control can return to 502 in which a hash function corresponding to a next unprocessed row is processed. In an embodiment, if there are no more unprocessed rows (all rows have been processed), the method 500 ends and passes information back to method 400 (not shown), indicating that an entry is not located.

Methods 400 and 500 will now be explained using the example of filters 600-650 shown in FIGS. 6A-6F.

FIG. 6A is a block diagram illustrating a state 600 of a filter after being initialized with default values. In this example, the state 600 of the filter can result after performing 402 shown in method 400.

In an embodiment, the bucket values can be pre-definable entries. In the example shown in 600, the entry of each bucket in the first row is 1 and the entry of each bucket in the second and third rows is 2. In an embodiment, a distribution of entries in a given column can vary, while values in a given row are the same. For example, each bucket in the first row is populated with a same entry (1), each bucket in the second row is populated with a same entry (2), and each bucket in the third row is populated with a same entry (2). The choice of seeding values can be adapted to rate limiting needs. In an embodiment, a sum of values in a same column corresponds to the rate limiting parameter (also referred to as a "configuration parameter" or a "rate limiting configuration parameter"). For example, if the rate limiting parameter is 5 accesses per second, the bucket entry can be selected as shown in FIG. 6A in which the sum of the first row bucket entry (1), the second row bucket entry (2), and the third row bucket entry (2) is 5.

In an embodiment, the selection of entry for each row can decrease for each row. For example, where the rate limiting parameter is 6, there are three possible distributions of integer values: 1/2/3 (the values of the first row can be 1, the values for the second row can be 2, and the values for the third row can be 3), 3/2/1, or 2/2/2. The distribution 3/2/1 can advantageously allow access earlier compared to the 1/2/3 distribution because the first hash function corresponds to the first row, which is initialized at a higher level. Finding a hit in the first row means that, for the same request, hash functions need not be computed for subsequent rows. This can be less costly compared with 1/2/3, which has a greater chance of depleting the bucket in the first row, meaning that further hashing is performed to check subsequent row(s). In an embodiment, the breakdown can be changed to 2/2/2 if there are many collisions. This is because a collision in any row leads to a maximum of two tokens being shared as compared with 3/2/1, where a collision in the first row will lead to three tokens being shared, thereby exacerbating the impact of collisions. In summary, a distribution of 3/2/1 is relatively fast and relatively prone to collisions, and a distribution of 2/2/2 is relatively slow and reduces the impact of collisions. A choice of distribution can be selected for expected situations and desired performance or behavior.

FIG. 6B is a block diagram illustrating a state 610 of a filter after a first hash function. The first hash function can be performed as part of accessing the filter to locate an entry (e.g., 406 and 408 of method 400). In the example shown in FIG. 6B, performing a hash function causes a hit in the bucket (1, 1). This corresponds to locating an entry and proceeding to 412 and 416 in method 400. In this example, the state 610 of the filter can result after updating the filter (e.g., 416 shown in method 400) for a first time. That is, the filter can be updated by decrementing the entry to 0.

FIG. 6C is a block diagram illustrating a state 620 of a filter after a second hash function. The second hash function can be performed as part of accessing the filter to locate an entry (e.g., 406 and 408 of method 400). In an embodiment, the state 620 of the filter can result after processing a second request. In the example shown in FIG. 6C, performing a hash function causes a hit in the bucket (1, 1). Because the entry of the bucket in the first row is 0, another hash function can be performed on the second row, which results in a hit in bucket (3, 2) and the entry in this bucket decrements to 1. Using the example of method 500, which corresponds to 406 and 408 of method 400, in 504 of method 500, processing row 1 results in no entry meeting a rate limiting criteria (506). Because row 2 has not been processed (508), a hash function corresponding to row 2 is performed and row 2 is processed. In the example shown, the processing of row 2 identifies bucket (3, 2). Because the bucket (3, 2) entry meets a rate limiting criteria (the value of the entry is 2, which is a non-zero entry in this example), an entry is located.

FIG. 6D is a block diagram illustrating a state 630 of a filter after a third hash function. The third hash function can be performed as part of accessing the filter to locate an entry (e.g., 406 and 408 of method 400). In an embodiment, the state 630 of the filter can result after processing a third request. In the example shown in FIG. 6D, performing a hash function causes a hit in the bucket (1, 1). Because the entry of the bucket is 0, another hash function can be performed, which results in a hit in bucket (3, 2) and the entry decrements to 0. Using the example of method 500, which corresponds to 406 and 408 of method 400, in 504 of method 500, processing row 1 results in no entry being located. Because row 2 has not been processed (508), a hash function corresponding to row 2 is performed and row 2 is processed. In the example shown, the processing of row 2 identifies bucket (3, 2). Because the bucket (3, 2) entry meets a rate limiting criteria (the value of the entry is 1, which is a non-zero entry in this example), an entry is located.

FIG. 6E is a block diagram illustrating a state 640 of a filter after a fourth hash function. The fourth hash function can be performed as part of accessing the filter to locate an entry (e.g., 406 and 408 of method 400). In an embodiment, the state 640 of the filter can result after processing a fourth request. In the example shown in FIG. 6E, performing a hash function causes a hit in the bucket (1, 1). Because the entry of the bucket is 0, another hash function can be performed, which results in a hit in bucket (3, 2). Because the entry of the (3, 2) bucket is also 0, another hash function can be performed which results in a hit in bucket (2, 3) and the entry decrements to 1. Using the example of method 500, which corresponds to 406 and 408 of method 400, in 504 of method 500, processing row 1 results in no entry being located. Processing row 2 also results in no entry being located. Because row 3 has not been processed (508), a hash function corresponding to row 3 is performed and row 3 is processed. In the example shown, the processing of row 3 identifies bucket (2, 3). Because the bucket (2, 3) entry meets a rate limiting criteria (the value of the entry is 2, which is a non-zero entry in this example), an entry is located.

FIG. 6F is a block diagram illustrating a state 650 of a filter after a fifth hash function. The fifth hash function can be performed as part of accessing the filter to locate an entry (e.g., 406 and 408 of method 400). In an embodiment, the state 650 of the filter can result after processing a fifth request. In the example shown in FIG. 6F, performing a hash function causes a hit in the bucket (1, 1). Because the entry of the bucket is 0, another hash function can be performed, which results in a hit in bucket (3, 2). Because the entry of the (3, 2) bucket is also 0, another hash function can be performed which results in a hit in bucket (2, 3) and the entry decrements to 0. Using the example of method 500, which corresponds to 406 and 408 of method 400, in 504 of method 500, processing row 1 results in no entry being located. Processing row 2 also results in no entry being located. Because row 3 has not been processed (508), a hash function corresponding to row 3 is performed and row 3 is processed. In the example shown, the processing of row 3 identifies bucket (2, 3). Because the bucket (2, 3) entry meets a rate limiting criteria (the value of the entry is 1, which is a non-zero entry in this example), an entry is located.

Should a client attempt a subsequent access of a resource causing a hit of the bucket (2, 3) whose entry is 0, a rate limiting operation would be performed because all counters have been decremented to 0. This could indicate that all available connections or bandwidth have been exhausted. In other words, in 508 of method 500, all rows have been processed without locating an entry. The method 500 ends and returns that no entry is located. According to 414, a rate limiting operation is then performed because no entry is located. In an embodiment, access is not permitted until re-initialization of the hash table to reset the counters as described herein.

If different entities that are active in the same time period map to the same entry in the filter, they will share these overlapped counters and hence effectively get rate limited to a lower value than individually allowed. FIG. 7 shows an exemplary state of a filter 700 after three hash functions for a first client and three hash functions for a second client. The hash hits for the first client are represented by hatching going from bottom left to upper right, e.g., buckets (1, 1), (2, 2) and (4, 3). The hash hits for the second client are represented by hatching going from top left to bottom right, e.g., buckets (4, 1), (2, 2) and (3, 3). In the example shown, there is a hash collision in bucket (2, 2) because a hash function for the first client and a hash function for the second client both result in the same bucket.

A hash collision may decrease accuracy of rate limiting because a client may be denied access to a resource earlier than desired by a parameter. For example, each hash hit can decrease a counter in the bucket. Because both the first client and the second client result in a hit in bucket (2, 2), the counter for that bucket can be decreased twice. This means that the counter will reach 0 sooner than if there was no collision. Supposing that a client is denied access upon a counter reaching 0, the first client and the second client would both be denied access to a resource earlier than desired because the counter is decremented more quickly than if there is no collision. Effectively, the rate limit will be lower than the specified rate.

As the number of clients grows relative to the size of the filter, the probability of hash collisions increases. This can reduce the accuracy of the techniques described above. Various techniques have been developed to reduce hash collisions. Hash collisions can be reduced by changing timing between initializations, resizing the filter, and/or changing hash functions.

FIG. 8 shows an example of timing for initialization 800. In an embodiment, the initialization can take place periodically over time. In an embodiment, the initialization can take place at pre-determined intervals, dynamically, regular, or irregular intervals over time. Timing of re-initialization can be based on one or more rate limiting parameters, as described herein. In FIG. 8, there are three initializations: A, B, and C. Between the initializations, it can be inferred that a number of collisions H1-H8 occurred indicating that hash functions for at least two different entities resulted in the same hit in a filter. The timing of re-initialization can be adjusted to reduce the number of collisions as colliding entities may not make uniformly interleaved requests. As shown in FIG. 8, the filter can be initialized earlier (the duration between two initializations decreased) to decrease the number of collisions. Supposing that the inferred number of collisions (approximately six) is undesirable (between initialization A and initialization B), the number of collisions can be reduced (to approximately two) by decreasing the duration between initialization B and initialization C as shown.

In an embodiment, re-initialization can include the same steps as initialization. For example, re-initialization can populate the buckets of the hash table with a set of pre-defined values. In some embodiments, re-initialization expects the same entries within a row, but allows for different entries across rows. Re-initialization can populate the hash table with at least one entry different from an entry with which the filter is initialized. For example, a counter can be set to a different value from an initial counter, a number of tokens can be different from an initial number of tokens, etc.

In an embodiment, the probability of hash collisions can be reduced by parameterizing the size of the filter. For example, the number of rows and/or columns can be changed. For example, if a few thousand active entities are expected at a given time, a number of rows can be set to the order of 2-3 and a number of columns can be set to the order of 100-200. As another example, if billions of active entities are expected at a given time, a number of rows can be set to the order of 5-8 and a number of columns can be set to the order of 4000-8000. The actual entries selected can be determined empirically based on measuring actual system performance and adjusting the entries based on feedback of the measurements. Since MSFs allow logarithmic scaling, the resource consumption does not increase significantly if more entities are to be rate limited. This allows resizing the multistage filter if needed. Furthermore, this resizing can also be performed dynamically based on time-of-day (e.g., some entities may be active during business hours than during non-business hours or vice versa) or other factors.

In an embodiment, the probability of hash collisions can be reduced by changing hash functions. The independent hash functions used per row are changed periodically. Changing the hash function changes the bucket indices corresponding to different entities, which can change the distribution and/or probability of hash collisions.

In an embodiment, additional client requests are monitored. For example, requests are received for access to resources. The requests can be made by one or more clients. The requests can be processed by accessing the rate limiting multistage filter. In some instances, to accommodate numerous client requests and avoid collisions, the size of the filter can be adjusted.

Resizing a filter can reduce memory consumption and CPU use and/or reduce hash collisions. For example, if the number of denied requests exceeds a first threshold, the size of the filter is increased. If the number of denied requests is less than a second threshold, the size of the filter is decreased. In an embodiment, the filter can be sized according to desired behavior. For example, if no client request is denied within a predetermined threshold, the filter can be downsized. The predetermined threshold can be a length of time. This can advantageously save memory because the benefit of saving memory outweighs the cost of an increased probability of a hash collision or decrease in accuracy. As another example, if more client requests are denied than a predetermined threshold, the filter can be upsized. The predetermined threshold can be a length of time. This can advantageously increase accuracy because the benefit of increasing accuracy by decreasing the probability of a hash collision outweighs the cost of increasing the size of the filter. In various embodiments, adjusting the size of the filter includes adjusting the number of rows, the number of columns, or both. In an embodiment, the filter is dynamically sized for each initialization.

In an embodiment, a table is sized to avoid excessive collisions (exceeding a threshold). The table size can be increased by increasing rows or columns. In an embodiment, it is advantageous to add columns, which consumes less memory compared with adding rows. Table size can depend on traffic: when there is heavy traffic, a table can be made relatively larger compared with lighter traffic times. In an embodiment, a hash table is four rows and 1024 columns. For a table of this size, few collisions are expected for clients on the order of hundreds and files on the order of dozens. In an embodiment, a smaller table can be used if re-initialization is performed more often. The frequency of re-initialization can be pre-defined. For example, if the rate limiting is desired to be 5 per second, this is equivalent to 100 accesses per 20 seconds or 2.5 accesses per half second. In an embodiment, the initialization period can be a half second and the initialization count (number of initializations) can be 2.5. Depending on the size of the table, the table can be stored in cache memory (e.g., if relatively small) or another memory.

Techniques of the present disclosure provide dynamic and scalable tracking and limiting. By using the techniques described herein, network traffic can be easily managed even when a client list grows. Also, the ADC does not need to keep track of a list of clients and/or files, which can save memory and computational power. The techniques disclosed herein work for many different types of sets of clients and need not know the identity of a client and/or resource to effectively provide admission control. The filter described herein can be kept relatively small and accommodate a relatively large number of clients. For example, two sets of clients having complementary idle times may use the same hash table bucket(s) during two different periods of time. The filter described herein can be dynamically sized and adapt to changing network needs to effectively and efficiently manage network traffic and improve the security of networks by preventing denial-of-service attacks.

Figure 9:
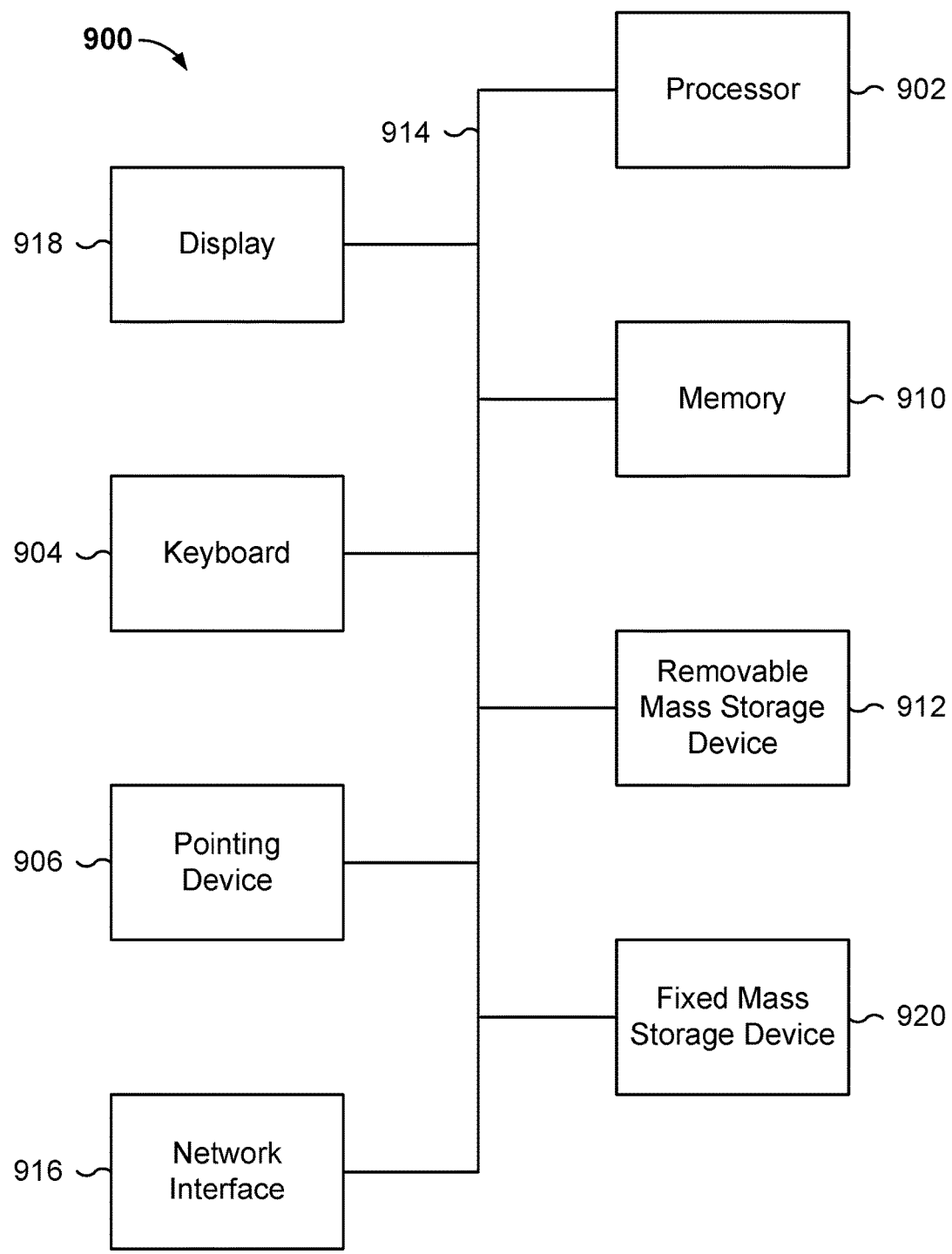
FIG. 9 is a functional diagram illustrating a programmed computer system for network traffic management in accordance with some embodiments.

FIG. 9 is a functional diagram illustrating a programmed computer system for managing network traffic in accordance with some embodiments. As will be apparent, other computer system architectures and configurations can be used to manage network traffic. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In some embodiments, processor 902 includes and/or is used to perform the techniques described herein.

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 902 to perform its functions (e.g., programmed instructions). For example, memory 910 can include any suitable computer-readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or uni-directionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing network traffic, comprising:
   initializing a rate limiting multistage filter, the initialization being based at least in part on a configuration parameter, wherein the rate limiting multistage filter includes a plurality of entry look-up stages;
   receiving a request from a client to access a resource;
   determining an entity identifier based at least in part on the received request;
   accessing the rate limiting multistage filter to locate an entry that meets a rate limiting criteria including by:
      performing a first stage look-up operation using the entity identifier to locate an entry in the rate limiting multistage filter having a value that at least meets a threshold; and
      in response to an entry not being found in the first stage, performing a second stage look-up operation using the entity identifier to locate an entry in the rate limiting multistage filter having a value that at least meets the threshold;
   in response to locating an entry that meets the rate limiting criteria, permitting the client to proceed with the request; and
   in response to not locating an entry that meets the rate limiting criteria, performing a rate limiting operation to manage network performance.

2. The method of claim 1, further comprising, in response to locating an entry that meets the rate limiting criteria, updating the rate limiting multistage filter.

3. The method of claim 1, further comprising, in response to locating an entry that meets the rate limiting criteria, decreasing the value of the located entry of the rate limiting multistage filter by a size of the requested resource.

4. The method of claim 1, further comprising, in response to locating an entry that meets the rate limiting criteria, decrementing the value of the located entry of the rate limiting multistage filter.

5. The method of claim 1, wherein the rate limiting operation includes at least one of: dropping a connection between the client and the resource, logging an event corresponding to meeting the rate limiting criteria, and changing a rate of data transfer of a connection between the client and the resource.

6. The method of claim 1, wherein the rate limiting multistage filter includes a hash table.

7. The method of claim 1, wherein:
   the rate limiting multistage filter includes a hash table; and
   a row of the hash table corresponds to a hash function different from a hash function corresponding to a different row of the hash table.

8. The method of claim 1, wherein:
   the rate limiting multistage filter includes a hash table; and
   a sum of values in a column of the hash table corresponds to the configuration parameter, the configuration parameter defining a limit on rate of access of the resource by the client.

9. The method of claim 1, wherein:
   the rate limiting multistage filter includes a hash table; and
   within a column, a value of a row is different from a value of another row.

10. The method of claim 1, wherein:
    the rate limiting multistage filter includes a hash table; and
    values within a row are the same.

11. The method of claim 1, wherein:
    the rate limiting multistage filter includes a hash table; and
    the accessing the rate limiting multistage filter includes:
       performing a first hash function corresponding to a first location in the rate limiting multistage filter, and
       in response to a value at a first location not meeting a threshold, performing a second hash function corresponding to a second location in the rate limiting multistage filter.

12. The method of claim 1, wherein entries in the rate limiting multistage filter correspond to tokens, each entry containing at least one token, and the at least one token permitting access to the requested resource.

13. The method of claim 1, wherein entries in the rate limiting multistage filter correspond to bandwidth, the entry meeting the rate limiting criteria corresponding to a bandwidth that exceeds a threshold.

14. The method of claim 1, further comprising:
    receiving one or more requests from another client to access at least one of: the resource and additional resources; and
    processing the one or more requests by accessing the rate limiting multistage filter.

15. The method of claim 1, further comprising, in response to a determination that a number of performed rate limiting operations meets or exceeds a threshold, resizing the rate limiting multistage filter.

16. The method of claim 1, further comprising, in response to a determination that a number of performed rate limiting operations meets or exceeds a threshold, adding at least one row to the rate limiting multistage filter.

17. The method of claim 1, further comprising, in response to a determination that a number of performed rate limiting operations meets or is below a threshold within a predefined length of time, downsizing the rate limiting multistage filter.

18. The method of claim 1, wherein lists of client identities and resource identities are not required for performing the rate limiting operation.

19. The method of claim 1, further comprising re-initializing the rate limiting multistage filter with at least one entry different from an entry with which the rate limiting multistage filter was initialized.

20. The method of claim 1, further comprising re-initializing the rate limiting multistage filter with at least one hash function different from a hash function with which the rate limiting multistage filter was initialized.

21. The method of claim 1, wherein a size of the rate limiting multistage filter dynamically changes based at least in part on network traffic.

22. A system, comprising:
a processor configured to:
initialize a rate limiting multistage filter, the initialization being based at least in part on a configuration parameter, wherein the rate limiting multistage filter includes a hash table with a plurality of entries;
receive a request from a client to access a resource;
determine an entity identifier based at least in part on the received request;
access the rate limiting multistage filter to locate an entry that meets a rate limiting criteria including by hashing an entity identifier to at least one location in the rate limiting multistage filter, wherein an entry is located in response to a value at the at least one location meeting a threshold;
in response to locating an entry that meets the rate limiting criteria, permit the client to proceed with the request; and
in response to not locating an entry that meets the rate limiting criteria, perform a rate limiting operation to manage network performance; and
a memory coupled to the processor and configured to provide the processor with instructions.

23. A computer program product, the computer program product being embodied in a non-transitory computer readable storage medium and comprising computer instructions for:
initializing a rate limiting multistage filter, the initialization being based at least in part on a configuration parameter, wherein the rate limiting multistage filter includes a plurality of entry look-up stages;
receiving a request from a client to access a resource;
determining an entity identifier based at least in part on the received request;
accessing the rate limiting multistage filter to locate an entry that meets a rate limiting criteria including by:
performing a first stage look-up operation using the entity identifier to locate an entry in the rate limiting multistage filter having a value that at least meets a threshold; and
in response to an entry not being found in the first stage, performing a second stage look-up operation using the entity identifier to locate an entry in the rate limiting multistage filter having a value that at least meets the threshold;
in response to locating an entry that meets the rate limiting criteria, permitting the client to proceed with the request; and
in response to not locating an entry that meets the rate limiting criteria, performing a rate limiting operation to manage network performance.

24. The method of claim 11, further comprising:
determining that an entry is not located in response to performing a respective hash function for each row of the rate liming multistage filter without finding an entry with a value meeting the threshold.

* * * * *